United States Patent
Bhattacharjee

(10) Patent No.: US 11,315,164 B2
(45) Date of Patent: Apr. 26, 2022

(54) COMPLEMENTARY PRODUCT RECOMMENDATION SYSTEMS

(71) Applicant: Target Brands, Inc., Minneapolis, MN (US)

(72) Inventor: Kasturi Bhattacharjee, Minneapolis, MN (US)

(73) Assignee: TARGET BRANDS, INC., Minneapolis, MN (US)

( * ) Notice: Subject to any disclaimer, the term of this patent is extended or adjusted under 35 U.S.C. 154(b) by 161 days.

(21) Appl. No.: 16/417,443

(22) Filed: May 20, 2019

(65) Prior Publication Data

US 2019/0370879 A1 Dec. 5, 2019

Related U.S. Application Data

(60) Provisional application No. 62/673,653, filed on May 18, 2018.

(51) Int. Cl.
  *G06Q 30/06* (2012.01)
  *G06N 20/00* (2019.01)
  *G06N 3/08* (2006.01)

(52) U.S. Cl.
  CPC ........... *G06Q 30/0631* (2013.01); *G06N 3/08* (2013.01); *G06N 20/00* (2019.01); *G06Q 30/0641* (2013.01)

(58) Field of Classification Search
  CPC ........... G06Q 30/0631; G06Q 30/0641; G06N 20/00; G06N 3/08
  See application file for complete search history.

(56) References Cited

U.S. PATENT DOCUMENTS

| 6,138,105 | A | 10/2000 | Walker et al. |
| 8,103,520 | B2 | 1/2012 | Mueller et al. |
| 8,200,530 | B2 | 6/2012 | Kniaz et al. |
| 2019/0080225 | A1* | 3/2019 | Agarwal ................. G06F 16/35 |
| 2019/0295151 | A1* | 9/2019 | Ghadar ................. G06T 19/006 |

OTHER PUBLICATIONS

"Loss Functions" ML Compiled, https://ml-compiled.readthedocs.io/en/latest/loss_functions.html (Year: 2018).*

T. Zhao, J. McAuley, M. Li and I. King, "Improving recommendation accuracy using networks of substitutable and complementary products," 2017 International Joint Conference on Neural Networks (IJCNN), 2017, pp. 3649-3655, doi: 10.1109/IJCNN.2017.7966315. (Year: 2017).*

Bell et al., Learning visual similarity for product design with convolutional neural networks, Cornell University, Available prior to May 20, 2019—filing date of application; 10 Pages.

(Continued)

*Primary Examiner* — Michelle T Kringen
(74) *Attorney, Agent, or Firm* — Merchant & Gould P.C.

(57) ABSTRACT

Generally, the present disclosure relates to methods and systems for generating complementary product recommendations. In some example aspects, human-identified complementarity of a subset of products can be used to train a neural network, which is in turn used to generate pairwise complementarity values for items. Based on such values, complementary items can be identified.

15 Claims, 10 Drawing Sheets

(56) References Cited

OTHER PUBLICATIONS

Gomes, Farfetch: Boosting Recommender Systems for Deep Learning; Available prior to May 20, 2019—filing date of application; 17 Pages.
Kang et al., Visually-Aware Fashion Recommendation and Design with Generative Image Models; Available prior to May 20, 2019—filing date of application; 10 Pages.
Le et al., Distributed Representations of Sentences and Documents, Google Inc.; May 22, 2014; 9 Pages.

* cited by examiner

TCIN: 50451644

TCIN: 52173735  Score: 0.9764253627508879

TCIN: 16765928  Score: 0.8911469355225563

TCIN: 15126434  Score: 0.8785709440708l6

TCIN: 16452473  Score: 0.8742876052856445

TCIN: 50518781

TCIN: 53040321
Score: 0.98540115356445313

TCIN: 12443148
Score: 0.98799771070480355

TCIN: 53058859
Score: 0.98323720693588266

COMPLEMENTARY PRODUCT RECOMMENDATION SYSTEMS

CROSS-REFERENCE TO RELATED APPLICATIONS

The present application claims priority from U.S. Provisional Patent Application No. 62/673,653, filed on May 18, 2018, the disclosure of which is hereby incorporated by reference in its entirety.

BACKGROUND

Customers visiting a retail site may browse various categories to identify an item for purchase. Such customers may wish to purchase an item of a particular type, and would not normally browse for other items that they may have interest in, but which do not come to mind at the time they are browsing the site. Accordingly, a retailer may only sell to the customer the item the customer is seeking, despite the fact that the customer would be interested in other items that might be useable with the item purchased.

One context in which this problem arises is in the area of "complementary" items. Complementary items may be items that are not specifically associated with a selected item, but which may, based on shopping experience, or expert advice, be used together. This may be either by function, or based on complementary appearance, or other factors. Because such complementary items may be difficult to identify, the extent to which customers may be presented with optional complementary items for purchase (alongside the primary item selected by that user) is limited.

SUMMARY

Generally, the present disclosure relates to methods and systems for generating complementary product recommendations. In some example aspects, human-identified complementarity of a subset of products can be used to train a neural network, which is in turn used to generate pairwise complementarity values for items. Based on such values, complementary items can be identified.

In one aspect, a method of generating a set of one or more complementary items associated with an item is disclosed. The method includes receiving data identifying one or more pairs of complementary items from within an item collection, the one or more pairs of complementary items being a subset of all items included in the item collection, and generating a model of item complementarity based at least in part on the one or more pairs of complementary items and item descriptions of each of the items included in the item collection. The method includes receiving a selection of a seed item from within the item collection, and, in response to selection of the seed item, identifying one or more complementary items. At least one of the seed item or the one or more complementary items is not included in the one or more pairs of complementary items included in the received data.

In a second aspect, a system for generating a set of one or more complementary items associated with an item is disclosed. The system includes a computing system comprising a processor operatively connected to a memory. The memory stores computing instructions which, when executed by the processor, cause the computing system to: generate a model of item complementarity based at least in part on data identifying one or more pairs of complementary items and item descriptions of each of the items included in an item collection, the one or more pairs of complementary items being a subset of all items included in the item collection; receive a selection of a seed item from within the item collection; and in response to selection of the seed item, identify one or more modeled complementary items. At least one of the seed item or the one or more modeled complementary items is not included in the one or more pairs of complementary items included in the received data.

In a third aspect, a system for generating a set of one or more complementary items associated with an item is disclosed. The system includes a computing system comprising a plurality of computing devices, the plurality of computing devices including a retail web site server and a complementary item computing device. The computing system stores instruction which, when executed, cause the computing system to: generate a model of item complementarity based at least in part on data identifying one or more pairs of complementary items and item descriptions of each of the items included in an item collection, the one or more pairs of complementary items being a subset of all items included in an item collection; receive a user input identifying a seed item from within the item collection; provide the selection of the seed item to the complementary item computing device via an API; in response to receiving of the seed item, identify, at the complementary item computing device, one or more modeled complementary items, at least one of the seed item or the one or more modeled complementary items not being included in the one or more pairs of complementary items included in the received data; and generate, at the retail web site server, a user interface displaying the one or more modeled complementary items.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
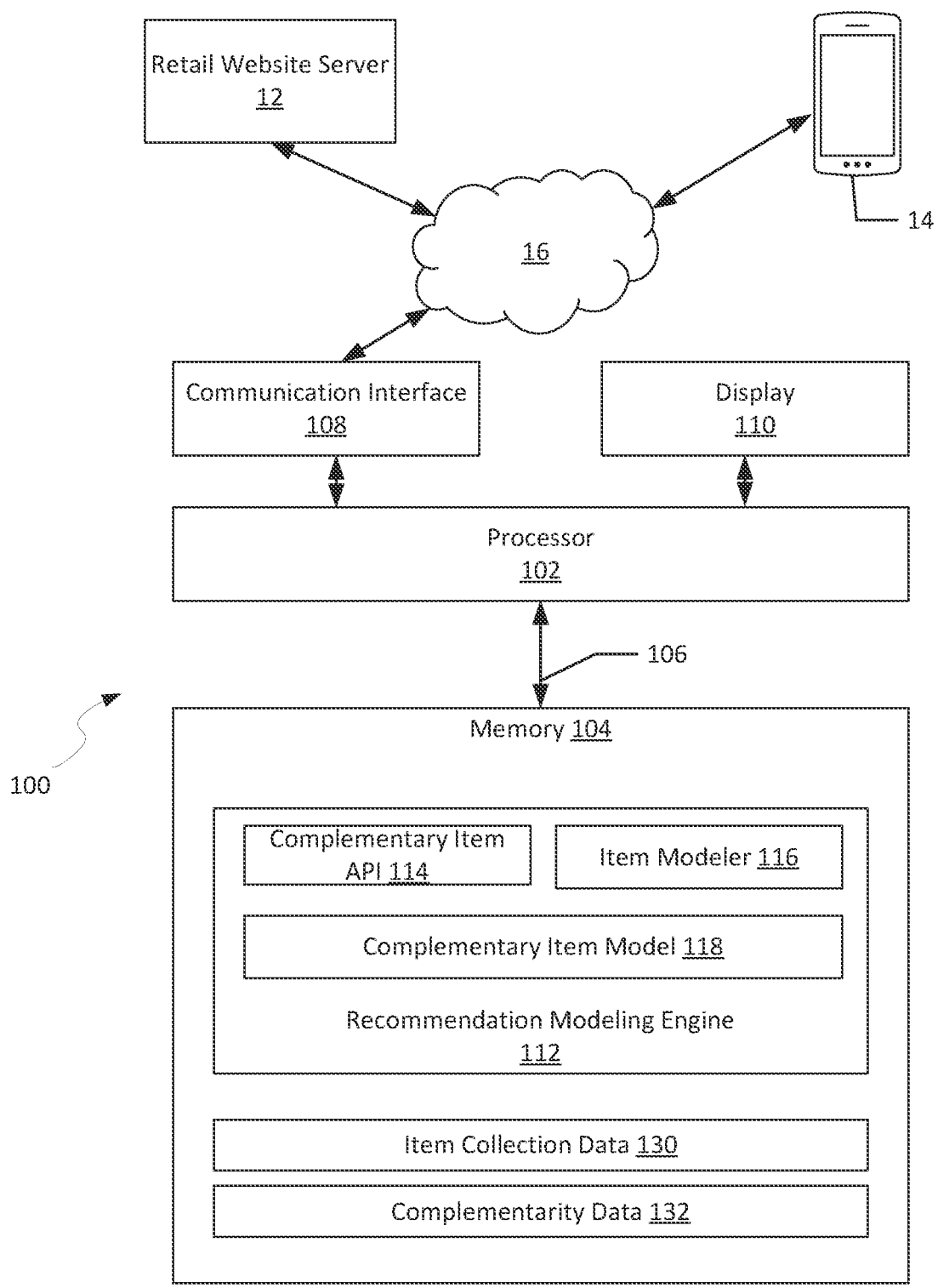
FIG. 1 illustrates a system for presenting items in an online environment based on previous item selections, and in particular in a retail context, according to an example embodiment.

As briefly described above, embodiments of the present invention are directed to generation of complementary product recommendations, given a particular product. For example, complementary products may refer to items that may be used together, i.e. those that complement one another in their function. Examples include a pair of trousers and a belt, a sofa and a cushion, etc. When consumers are viewing/purchasing items, it might make sense to recommend items that are complementary to them. In this work, we aim at designing a recommendation strategy that suggests complementary products given a seed item that a consumer may be viewing or purchasing.

In some example aspects, the notion of complementarity is derived from product collections curated by merchandising partners who inherently use art to determine what consumers like. This work leverages their expertise and uses machine learning to generate product recommendations that are complementary. Some example implementations employ a neural-network based supervised learning strategy which aims at learning representations of products that capture complementarity. These representations are then used to recommend products.

In accordance with the present disclosure, a neural network is trained to learn item representations that capture complementarity. The complementarity is a value that is generated based on a pair of items, with the model classifying that pair of items in a binary fashion as complementary or not complementary.

In accordance with the following disclosure, methods and systems for generating a set of one or more complementary items associated with an item is disclosed. One method includes receiving data identifying one or more pairs of complementary items from within an item collection, the one or more pairs of complementary items being a subset of all items included in the item collection, and generating a model of item complementarity based at least in part on the one or more pairs of complementary items and item descriptions of each of the items included in the item collection. The method includes receiving a selection of a seed item from within the item collection, and, in response to selection of the seed item, identifying one or more complementary items. At least one of the seed item or the one or more complementary items is not included in the one or more pairs of complementary items included in the received data.

Certain aspects of the present disclosure include generating complementarity scores between the seed item and each of a plurality of items within the item collection, and, based on a complementarity score between the seed item and an item from among the plurality of items being above a predetermined complementarity threshold, including the item from among the plurality of items within the one or more complementary items. In accordance with the present disclosure, complementary items may be generated where there is no preexisting defined complementarity among items, allowing for automated suggestions of other items a user (e.g., a customer) may wish to consider grouping with the item selected (e.g., purchasing based on a prior selection or item added to a shopping cart).

FIG. 1 illustrates a system 10 for presenting items in an online environment based on previous item selections, and in particular in a retail context, according to an example embodiment. The system includes a recommendation modeling computing system 100, communicatively connected to a retail web server 12 and a user device 14 via network 16 (e.g., the Internet). The retail web server presents items to a user device, which displays such items to the user via either a browser or application.

The recommendation modeling computing system 100 includes a processor 102 communicatively connected to a memory 104 via a data bus 106. The processor 102 can be any of a variety of types of programmable circuits capable of executing computer-readable instructions to perform various tasks, such as mathematical and communication tasks.

The memory 104 can include any of a variety of memory devices, such as using various types of computer-readable or computer storage media. A computer storage medium or computer-readable medium may be any medium that can contain or store the program for use by or in connection with the instruction execution system, apparatus, or device. By way of example, computer storage media may include dynamic random access memory (DRAM) or variants thereof, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Computer storage media generally includes at least one or more tangible media or devices. Computer storage media can, in some embodiments, include embodiments including entirely non-transitory components. In the embodiment shown, the memory 104 stores a recommendation modeling engine 112, as well as item collection data 130 and complementarity data 132, discussed in further detail below. The computing system 100 can also include a communication interface 108 configured to receive and transmit data, for example to access data in an external database. Additionally, a display 110 can be used for viewing recommendation information generated by engine 112.

In various embodiments, the recommendation modeling engine 112 includes a complementary item API 114, an item modeler 116, and a complementary item model 118. In general, the recommendation modeling engine 112 can receive requests, for example from the retail website server 12, and provide a response including one or more complementary items based on a selected item identified by the retail web site server 12.

In the example shown, the complementary item Application Programming Interface (API) 114 receives requests from other computing systems to provide complementary items. The Application Programming Interface (API) 114 is exposed to external systems and allows such systems to query, for a particular item, recommended complementary items. The complementary items are based, for example, on an identified item provided at the complementary item API 114. In example embodiments, the complementary item API 114 returns an item identifier (ID) of a plurality of items. The plurality of items may be, for example, a listing of a top 3-10 or more items based on complementarity scores generated by the recommendation modeling engine 112. Other numbers of complementary items may be provided as well. Also, other information, such as the complementarity scores generated, or item descriptive information, could also be provided.

The item modeler 116 generally uses item collection data 130 and complementarity data 132 to generate the complementary item model 118. The item collection data 130 represents item description information and item identification information for each of the items that may be provided by the retailer. For example, item collection data 130 may include an item ID, item name, item description, item price, and other information. Also, although shown as being included within the memory 104, the item collection data 130 may be stored remotely from the system 100 as well. In general, the item modeler 116 will receive item descriptions from the item collection data 130 and will perform a pairwise vectorization of each item description to each other item description in the item collection data, using a Doc2Vec/Paragraph2Vec model, described in: Quoc Le and Tomas Mikolov. Distributed representations of sentences and documents. In International Conference on Machine Learning, pages 1188-1196, 2014, the disclosure of which is incorporated by reference herein in its entirety.

In some embodiments, the item modeler 116 can then use item identifiers for items known to be complementary to create a trained model of item complementarity, i.e., the complementary item model 118. The item modeler 116 receives complementarity data 132, which is a listing of items known to be complementary to each other, and uses that information alongside the vectorized pairwise item descriptions to find ways in which the untrained item descriptions interrelate for modeling purposes. The complementarity data 132 represents data defining complementarity among some, but not all, of the items in the item collection data 130. In example embodiments, the item modeler 116 uses a Siamese network, as discussed below in connection with FIG. 4, to generate pairwise item complementarity scores for each pair of items within the item collection. These complementarity scores can then be used to generate, from the recommendation modeling engine 112, a ranking of complementarity of items, the top predetermined number of which may be identified as potentially complementary items.

It is noted that although some complementary items are known based on the complementarity data 132, the complementary item model 118, when created, will generate a complementarity score for each item relative to a given input item. A predetermined number of items having top complementarity scores can be returned.

As noted above, the computing system 100 can provide the set of complementary items to a retail web server 12, e.g., for delivery to a user device 14 in response to a request from that device. Example user interfaces 14 for providing such recommendations are provided in greater detail below.

Figure 2:
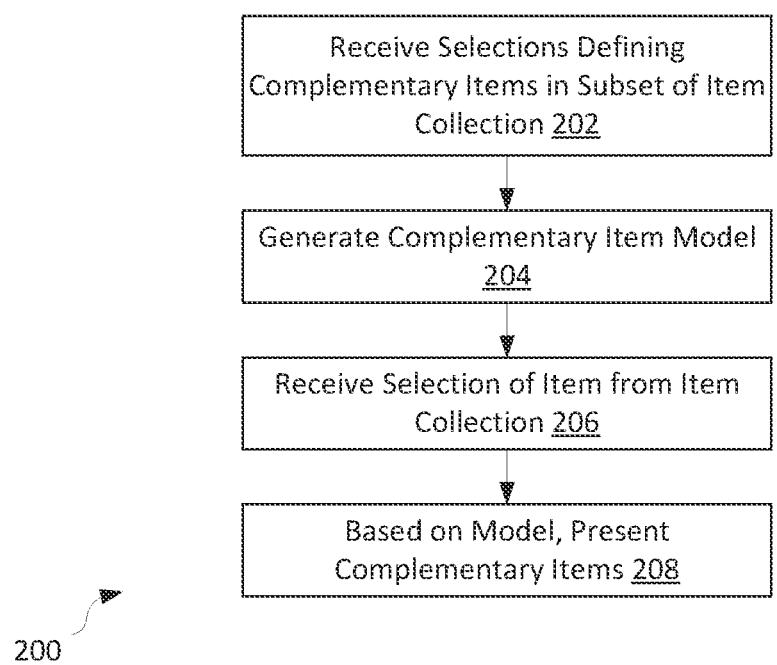
FIG. 2 illustrates a flowchart of a method for presenting complementary items in an online environment, according to an example embodiment.

FIG. 2 illustrates a flowchart 200 of a method for presenting items in an online environment based on previous item selections, according to an example embodiment. The method 200 can be performed using the system 10 of FIG. 1, above, and in particular the computing system 100.

At 202, the method 200 includes receiving information regarding items within an item collection known to be complementary to one another. This may be, for example, based on receipt of data identifying user-curated collections of items from within the item collection. It is noted that because a retailer's item collection is usually very large, it is not practical for a user to generate indications of complementary items within the entire collection. As such, the data identifying complementary items generally corresponds to items in an item collection that represent a relatively small portion of the overall item connection.

At 204, the method 200 includes generating a complementary item model. Generating a complementary item model involves performing a pairwise vectorization of item descriptions to generate embeddings indicative of similarity between two item descriptions, and then classifying those vectorized descriptions to determine the extent of complementarity. As noted above, the vectorizations of the items that are indicated as complementary can be performed using embeddings generated using Mikolov et. al's Doc2Vec/Paragraph2Vec model. Subsequent scoring of item pairs can be performed, for example, using a Siamese network as discussed below in connection with FIGS. 4-5. The Siamese network may be trained, for example, using known complementary items (using 1 as the value for known complementarity), and optionally a random assortment of known non-complementary items (using 0 as the value for known non-complementarity).

At 206, an identification of a particular selected item is received (e.g., at API 114). The item may be, for example, an item selected by a customer on a retailer website, or may be an item added to a customer's shopping cart on that website, indicating the customer's interest in the item. In response to receipt of the item identifier, at 208, a predetermined number of complementary items can be returned to a retail website server 12, for example, for display to the user.

Figure 3:
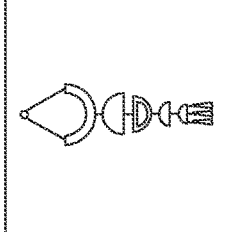
FIG. 3 illustrates an example collection of items offered by an online retail site.
Figure 4:
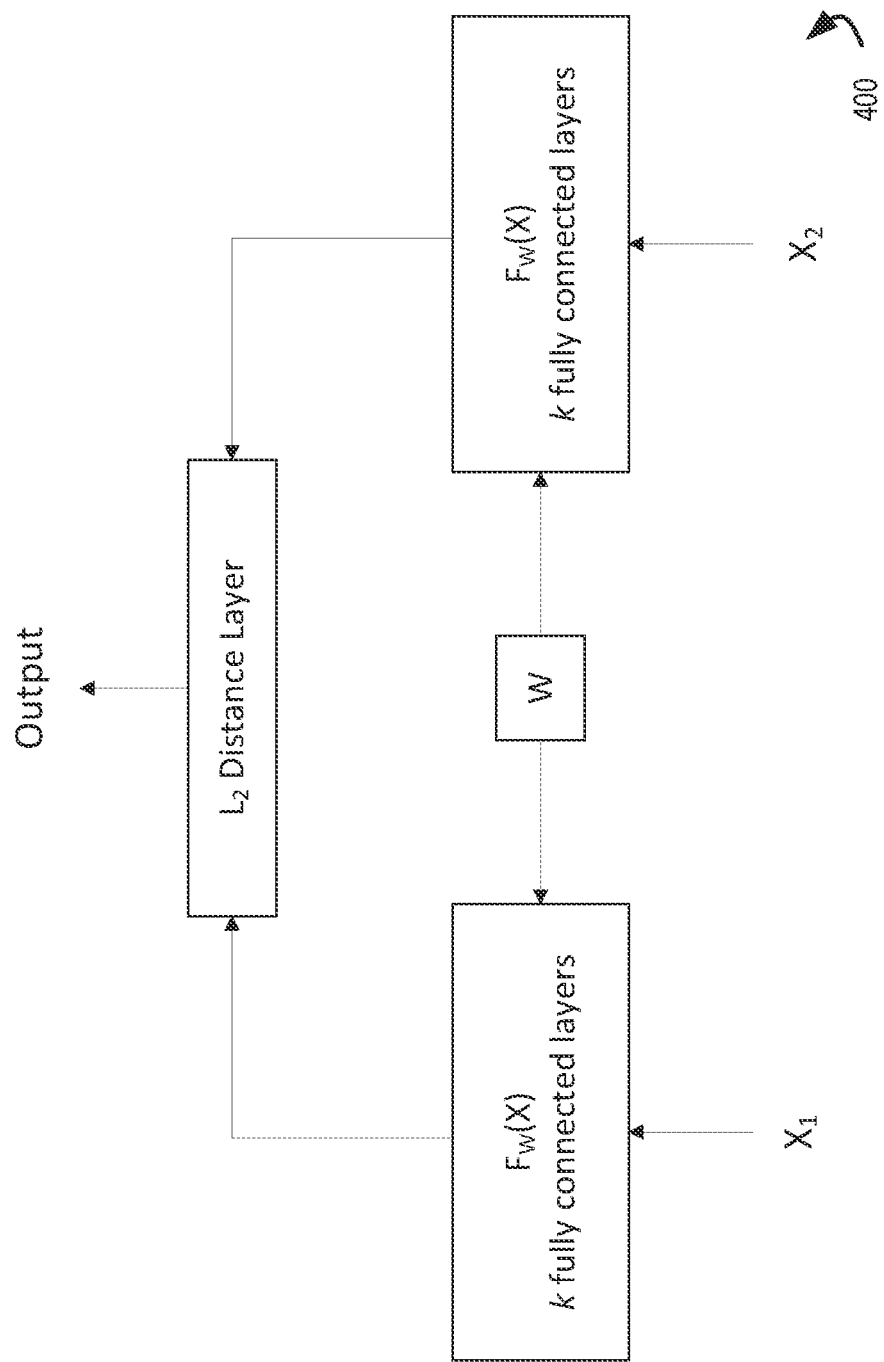
FIG. 4 illustrates a block diagram of a Siamese network useable to implement aspects of the present disclosure.

Referring now to FIGS. 3-4, an example implementation of the methods and systems described above are provided. FIG. 3 illustrates a portion of an example item collection 130, shown as curated item collection 300. The curated item collection 300 that may be indicated as complementary, and as such, will have associated complementarity data. In this example, a set of items are included in a user-curated item collection, and as such, each pair of items within the collection may be given a particular identifier indicating that the two items are complementary. For example, in some instances, each user-curated complementary item will have a value of 1 for its complementarity to a given item that is also within the same collection. Items within the item collection but for which there is no curated item complementarity value can have such an item complementarity value modeled for it.

As seen in block diagram 400 of FIG. 4, a particular modeling structure can be used to generate item complementarity values. In the example shown, a Siamese network with two identical subnetworks consisting of k Fully-Connected hidden layers is employed for classification of items as complementary or not. In example embodiments, identical subnetworks are used, i.e., those that have the same configuration with the same parameters and weights. The purpose of using this network is to project these text embeddings into an N-dimensional vector space where embeddings for items that are complementary to each other are located closer in the space, and those that are not, are located further apart.

For each pair of labeled items, the item text embeddings are fed in as an input to the Siamese network. In this embodiment, the network has k Fully-Connected hidden layers followed by an L2 distance layer between the embeddings of the last pair of hidden layers. The results depicted in FIG. 5, for example, use a k value of 2. The loss function used to train the model is Contrastive Loss, which is of the form:

$$L(W,(Y,X_1,X_2)^i) = Y^i(D_W^i)^2 + (1-Y^i)(\max(0, 1-D_W^i))^2$$

In the above, $(Y, X_1, X_2)^i$ is the ith labeled sample pair, $Y_i$ is the label of the ith pair (0 for non-complementary, 1 for complementary), and $D_i$ is the Euclidean distance between the pair of points.

Figure 5:
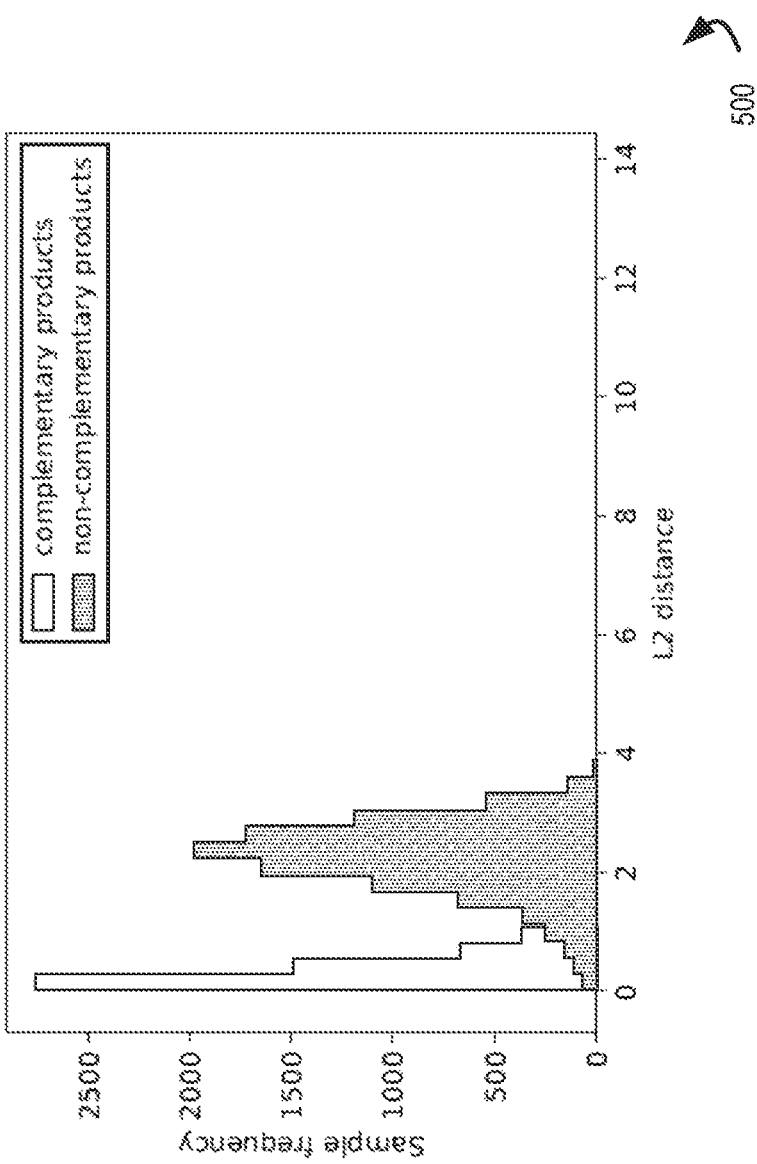
FIG. 5 is a chart showing distance between pairwise Siamese embeddings for both complementary and non-complementary products, in an example implementation.

Referring now to FIG. 5, a chart 500 illustrates results from evaluating a model that is executed as outlined above. In particular, in this example, a system is configured to consider manually curated collections of items from the specific categories on a retail website (e.g., home furnishing items on target.com) as the initial item collection of known complementary items. Collections are groups of items that work well with each other and have been curated by human experts. These collections can then be used to generate labels amongst item pairs. Positive labels are constructed between pairs of items within each collection, while negative labels are generated between pairs of items across collections that have no overlap. In the example dataset used herein, there are 590 collections in all, from which 42276 positive labels are generated, and 50000 randomly selected negative labels are also generated.

In the example evaluation seen in FIG. 5, the text data including the name, description and attributes of an item are considered the document for the Doc2Vec model, and text embeddings are generated for every item. The text descriptions and attributes of items can be derived from item descriptions from a website or inventory database, e.g., item collection data 130.

In particular, the input labeled samples are split using stratified sampling into training and test data to maintain the label distribution. The model is evaluated in the following ways:

(a) Distances between complementary pairs vs. non-complementary pairs of items: The goal of the method was to project complementary items closer in the embedding space and push those that are non-complementary further apart. In order to show these results, we look at the distance distribution for the siamese embeddings generated for the test data. FIG. 3 shows that the complementary items are indeed located closer to each other in the embedding space, as compared to the non-complementary items.

(b) Classification metrics: Precision, Recall, Accuracy and AUC are computed on both training and held-out test data. These are computed by selecting a distance threshold. Pairs of items from the test data whose embeddings are within that threshold are deemed complementary and those that exceed the threshold are deemed non-complementary. In Table 1, below, the threshold used is 0.9.

TABLE 1

Classification metrics with distance threshold 0.9

| Dataset | Accuracy | Precision | Recall | AUC |
| --- | --- | --- | --- | --- |
| Training | 96.19 | 0.955 | 0.939 | 0.957 |
| Test | 93.59 | 0.928 | 0.892 | 0.926 |

Using the trained model, item text embeddings for all items of the chosen category (Home in this case) are provided to the model. The output of the last hidden layer yields item representations that help capture complementarity.

Accordingly, and given a seed item and its representation, its nearest neighbors are computed in order to generate recommendations for the item. For example, nearest neighbors may be defined as those most similar on a normalized scale from 0 to 1. The items that lie closest in the embedding space to the seed item are served as recommendations.

Figure 6:
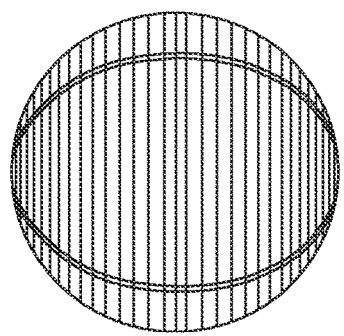
FIG. 6 illustrates an example seed item from a category of items useable to generate complementary product recommendations.
Figure 7:
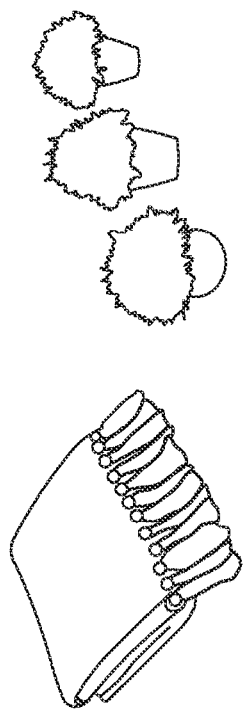
FIG. 7 illustrates a set of complementary product recommendations associated with the seed item of FIG. 6.
Figure 7:
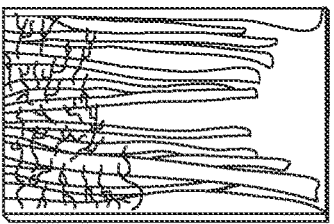
Figure 8:
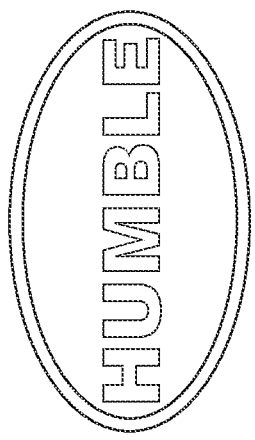
FIG. 8 illustrates an example seed item from a second category of items useable to generate complementary product recommendations.
Figure 9:
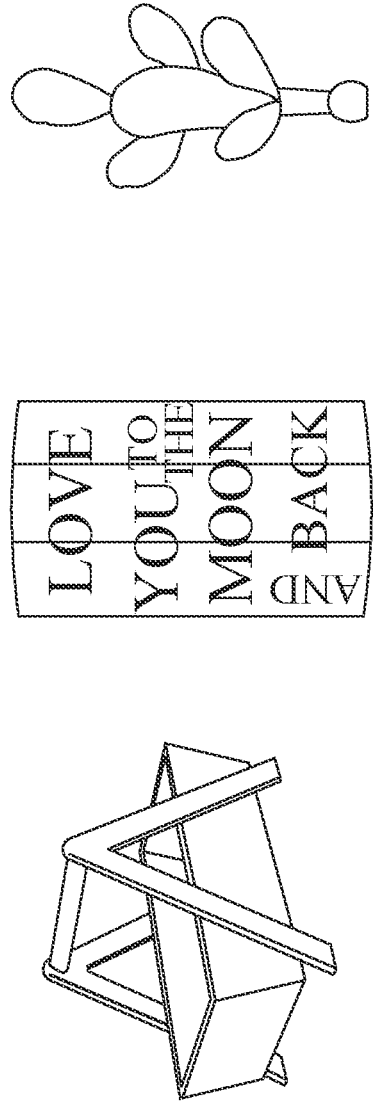
FIG. 9 illustrates a set of complementary product recommendations associated with the seed item of FIG. 8.
Figure 9:
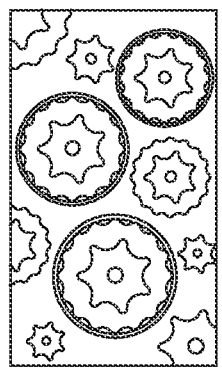
Figure 10:
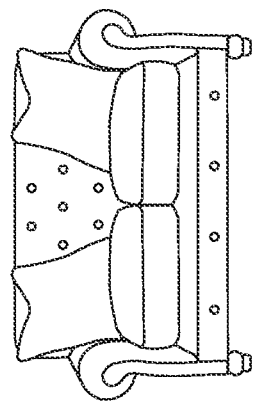
FIG. 10 illustrates an example seed item from a third category of items useable to generate complementary product recommendations.
Figure 11:
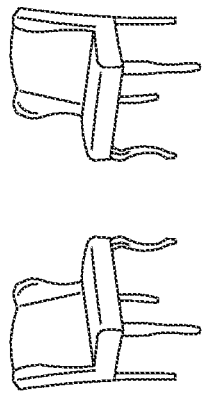
FIG. 11 illustrates a set of complementary product recommendations associated with the seed item of FIG. 10.
Figure 11:
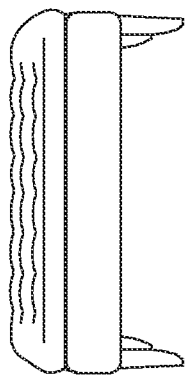
Figure 11:
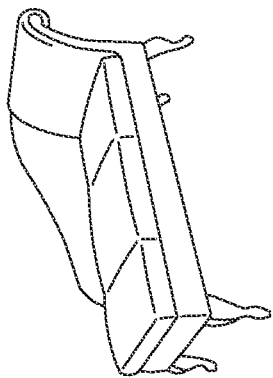

FIGS. 6, 8, and 10 illustrate example seed items 600, 700, 800, respectively in different departments of a retail website (home décor, home inspiration, and furniture, respectively). FIGS. 7, 9, 11 show a few examples of the recommendations 650, 750, 850, respectively generated for these categories. It is noted that although three recommended items are depicted in each of these examples, more or fewer recommendations could also be generated. Furthermore, although in FIGS. 7, 9, and 11 an item identifier and a complementarity score is depicted, in other examples (and as typically provided from the retail web site server 12), complementarity scores may be used to assess complementarity, but are not typically provided to the user.

Figure 12:
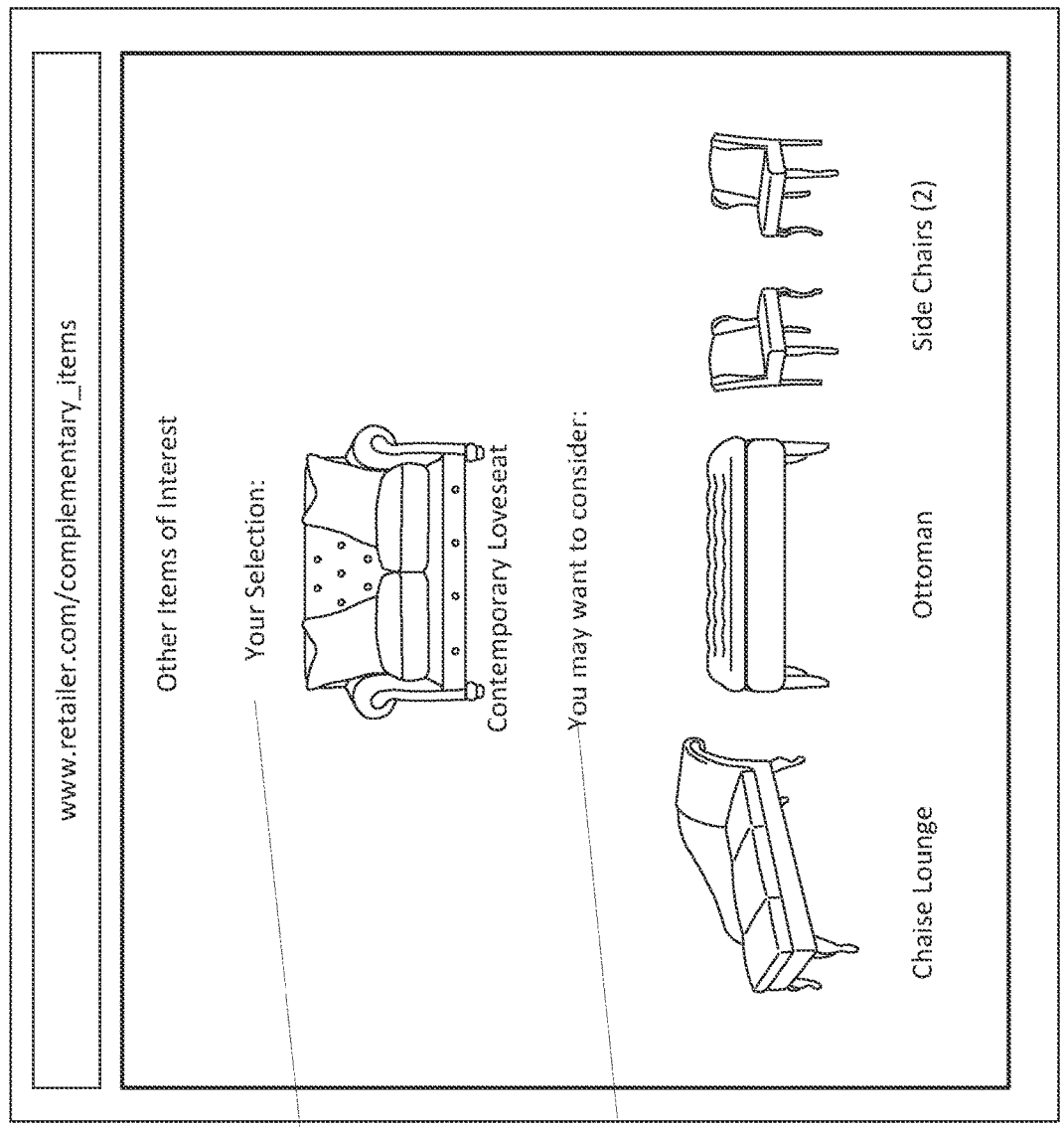
FIG. 12 illustrates a retailer interface useable for providing item recommendations for complementary items, according to an example implementation.

FIG. 12 illustrates a retailer interface 900 useable for providing item recommendations, according to an example implementation. The retailer interface 900 can be presented within a retailer website, such as may be provided by a retail web server 12 as noted above. The retailer interface 900 can be presented to a user a set of recommended products 904, e.g., items that may be complementary to an item 902 that was previously selected. As seen in the example, a selection of items can be presented to a user based on information returned to the retail web server 12 from the API 114 of system 100. The specific recommendations will change according to which item is selected, as well as any changes to an underlying complementarity model that may be driven by changes to the item collection and/or user-curated identifications of complementary items, as noted above.

Although the retailer interface 900 is presented within a browser window application, it is noted that different retailer interfaces could be presented in the alternative. For example, all or a subset of the complementary item listing could be presented to a user within a retailer website or mobile application. For example, only a most likely complementary item could be presented to a user for selection; in alternative arrangements, a reduced number of likely complementary items could be presented.

Figure 13:
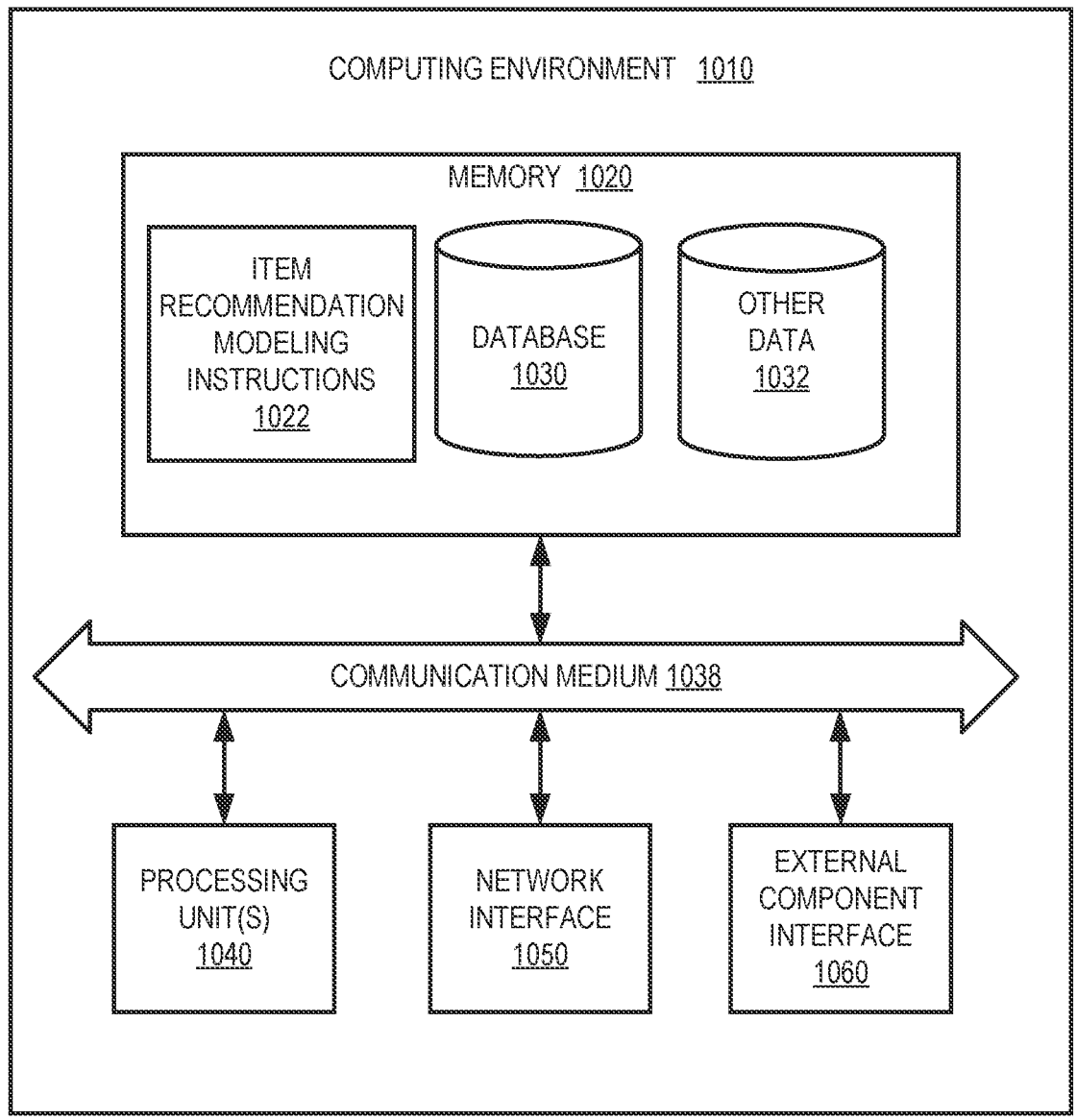
FIG. 13 is a block diagram of a computing system useable to implement aspects of the present disclosure.

FIG. 13 illustrates an example system 1000 with which disclosed systems and methods can be used. In an example, the system 1000 can include a computing environment 1010. The computing environment 1010 can be a physical computing environment, a virtualized computing environment, or a combination thereof, and useable as any of the computing systems described above in connection with FIG. 1. The computing environment 1010 can include memory 1020, a communication medium 1038, one or more processing units 1040, a network interface 1050, and an external component interface 1060.

The memory 1020 can include a computer readable storage medium. The computer storage medium can be a device or article of manufacture that stores data and/or computer-executable instructions. The memory 1020 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

The memory 1020 can store various types of data and software. For example, as illustrated, the memory 1020 includes instructions 1022 for implementing one or more aspects of the complementary item recommendation generation systems described herein, for example, the recommendation modeling engine 112, as well as database 1030 and other data 1032. In some examples the memory 1020 can include item collection data 130 and/or complementarity data 132, or instructions for accessing such data.

The communication medium 1038 can facilitate communication among the components of the computing environment 1010. In an example, the communication medium 1038 can facilitate communication among the memory 1020, the one or more processing units 1040, the network interface 1050, and the external component interface 1060. The communications medium 1038 can be implemented in a variety of ways, including but not limited to a PCI bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communications medium.

The one or more processing units 1040 can include physical or virtual units that selectively execute software instructions. In an example, the one or more processing units 1040 can be physical products comprising one or more integrated circuits. The one or more processing units 1040 can be implemented as one or more processing cores. In another example, one or more processing units 1040 are implemented as one or more separate microprocessors. In yet another example embodiment, the one or more processing units 1040 can include an application-specific integrated circuit (ASIC) that provides specific functionality. In yet another example, the one or more processing units 1040 provide specific functionality by using an ASIC and by executing computer-executable instructions.

The network interface 1050 enables the computing environment 1010 to send and receive data from a communication network (e.g., network 16). The network interface 1050 can be implemented as an Ethernet interface, a token-ring network interface, a fiber optic network interface, a wireless network interface (e.g., WI-FI), or another type of network interface.

The external component interface 1060 enables the computing environment 1010 to communicate with external devices. For example, the external component interface 1060 can be a USB interface, Thunderbolt interface, a Lightning interface, a serial port interface, a parallel port interface, a PS/2 interface, and/or another type of interface that enables the computing environment 1010 to communicate with external devices. In various embodiments, the external component interface 1060 enables the computing environment 1010 to communicate with various external components, such as external storage devices, input devices, speakers, modems, media player docks, other computing devices, scanners, digital cameras, and fingerprint readers.

Although illustrated as being components of a single computing environment 1010, the components of the computing environment 1010 can be spread across multiple computing environments 1010. For example, one or more of instructions or data stored on the memory 1020 may be stored partially or entirely in a separate computing environment 1010 that is accessed over a network.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A method of generating a set of one or more complementary items associated with an item, the method comprising:
    receiving data identifying one or more pairs of complementary items from within an item collection the received data including an item description for each complementary item of the one or more pairs;
    generating a model of item complementarity based on:
        performing a vectorization of a pair of item descriptions from the received data to generate text embeddings that are indicative of similarity between the pair of item descriptions, wherein performance of the vectorization produces vectorized pairs of item descriptions; and
        performing classification of the vectorized pairs of item descriptions to determine an extent of complementarity by scoring the vectorized pairs of item descriptions using a Siamese network, the Siamese network receiving as its input the generated text embeddings and having been previously trained on known pairs of complementary items and non-complementary items, wherein the Siamese network projects the generated text embeddings into an N-dimensional vector space where the generated text embeddings for pairs of complementary items are located closer in space than generated text embeddings for pairs of non-complementary items;
    receiving a selection of a seed item from within the item collection; and
    in response to selection of the seed item, identifying one or more modeled complementary items,
    wherein at least one of the seed item or the one or more modeled complementary items is not included in the one or more pairs of complementary items included in the received data.

2. The method of claim 1, further comprising:
generating complementarity scores between the seed item and each of a plurality of items within the item collection; and
based on a complementarity score between the seed item and an item from among the plurality of items being above a predetermined complementarity threshold, including the item from among the plurality of items within the one or more modeled complementary items.

3. The method of claim 1, wherein the Siamese model utilizes a Contrastive Loss function according to the following:

$$L(W,(Y,X1,X2)i)=Yi(DWi)2+(1-Yi)(\max(0,1-DWi))2,$$

wherein (Y, X1, X2)' is a labeled sample pair, Yi is a label value of the sample pair, and Di is a Euclidean distance between the pair of points.

4. The method of claim 3, wherein the Yi label value is a selected value of 0 for known non-complementary items and 1 for known complementary items.

5. The method of claim 1, further comprising outputting a listing of the one or more modeled complementary items.

6. The method of claim 5, wherein outputting the listing comprises providing the listing to a retail web server.

7. The method of claim 5, wherein outputting the listing comprises generating a user interface including a display of the one or more modeled complementary items and the seed item from a retail web site server.

8. A system for generating a set of one or more complementary items associated with an item, the system comprising:
a computing system comprising a processor operatively connected to a memory, the memory storing computing instructions which, when executed by the processor, cause the computing system to:
generate a model of item complementarity based at least in part on data identifying one or more pairs of complementary items and item descriptions of each of the items included in an item collection, the one or more pairs of complementary items being a subset of all items included in the item collection, the received data including an item description for each complementary item of the one or more pairs, the generating of the model of item complementarity including:
performance of a vectorization of a pair of item descriptions to generate text embeddings that are indicative of similarity between the pair of item descriptions, wherein performance of the vectorization produces vectorized pairs of item descriptions; and
performance of a classification of the vectorized pairs of item descriptions to determine an extent of complementarity by scoring the vectorized pairs of item descriptions using a Siamese network, the Siamese network receiving as its input the generated text embeddings and having been previously trained on known pairs of complementary items and non-complementary items, wherein the Siamese network projects the generated text embeddings into an N-dimensional vector space where the generated text embeddings for pairs of complementary items are located closer in space than generated text embeddings for pairs of non-complementary items;
receive a selection of a seed item from within the item collection; and
in response to selection of the seed item, identify one or more modeled complementary items,
wherein at least one of the seed item or the one or more modeled complementary items is not included in the one or more pairs of complementary items included in the received data.

9. The system of claim 8, wherein the computing system comprises a plurality of computing devices including a retail web site server.

10. The system of claim 9, wherein the instructions comprise a complementary products generation application accessible from the retail web site server via an application programming interface (API).

11. The system of claim 10, wherein the complementary products generation application includes instructions which cause the computing system to:
generate complementarity scores between the seed item and each of a plurality of items within the item collection; and
based on a complementarity score between the seed item and an item from among the plurality of items being above a predetermined complementarity threshold, include the item from among the plurality of items within the one or more modeled complementary items.

12. The system of claim 10, wherein the retail web site server is further configured to generate a user interface displaying the one or more modeled complementary items.

13. The system of claim 10, wherein the retail web site server is configured to provide, to the complementary products generation application via the API, an item identifier of the seed item.

14. A system for generating a set of one or more complementary items associated with an item, the system comprising:
a computing system comprising a plurality of computing devices, the plurality of computing devices including a retail web site server and a complementary item computing device, the computing system storing instruction which, when executed cause the computing system to:
generate a model of item complementarity based at least in part on data identifying one or more pairs of complementary items and item descriptions of each of the items included in an item collection, the one or more pairs of complementary items being a subset of all items included in an item collection, the received data including an item description for each complementary item of the one or more pairs, the generating of the model of item complementarity including:
performance of a vectorization of a pair of item descriptions to generate text embeddings that are indicative of similarity between the pair of item descriptions, wherein performance of the vectorization produces vectorized pairs of item descriptions;
performance of a classification of the vectorized pairs of item descriptions to determine an extent of complementarity by scoring the vectorized pairs of item descriptions using a Siamese network, the Siamese network receiving as its input the generated text embeddings and having been previously trained on known pairs of complementary items and non-complementary items, wherein the Siamese network projects the generated text embeddings into an N-dimensional vector space where the generated text embeddings for pairs of complementary items are located closer in space than generated text embeddings for pairs of non-complementary items;
receive a user input identifying a seed item from within the item collection;

provide the selection of the seed item to the complementary item computing device via an API;

in response to receiving of the seed item, identify, at the complementary item computing device, one or more modeled complementary items, at least one of the seed item or the one or more modeled complementary items not being included in the one or more pairs of complementary items included in the received data; and generate, at the retail web site server, a user interface displaying the one or more modeled complementary items.

15. The system of claim 14, wherein the user interface further displays the seed item.

* * * * *